United States Patent [19]

Stuart

[11] 4,442,661
[45] Apr. 17, 1984

[54] LAWN MOWER PUMP

[76] Inventor: Clifford H. Stuart, P.O. Box 367, Indiantown, Fla. 33456

[21] Appl. No.: 412,642

[22] Filed: Aug. 30, 1982

[51] Int. Cl.³ .................. A01D 35/26; F03B 11/02
[52] U.S. Cl. .................................. 56/16.9; 56/16.7; 417/236; 415/126
[58] Field of Search ............... 56/16.8, 16.9; 280/201; 417/236, 231; 415/121, 126, 133

[56] References Cited

U.S. PATENT DOCUMENTS

| | | | |
|---|---|---|---|
| 2,792,786 | 5/1957 | Nielsen | 417/236 |
| 2,862,453 | 12/1958 | Nagle | 415/126 |
| 2,868,134 | 1/1959 | Nagle | 415/126 |
| 3,151,563 | 10/1964 | Lita et al. | 417/236 |
| 3,402,688 | 9/1968 | Pusztay | 56/16.9 |
| 3,813,190 | 5/1974 | Keating | 56/16.9 |

Primary Examiner—Robert Peshock
Assistant Examiner—John G. Weiss
Attorney, Agent, or Firm—Malin, Haley, & McHale

[57] ABSTRACT

A rotary lawn mower pump including a rotary blade lawn mower with an upper housing having wheels connected thereto, an above housing motor with a drive shaft through the housing having a rotary blade connection portion beneath the housing, an impeller pump and a pump support fixedly connected to the impeller pump and adjustably connected to the housing. The impeller pump includes an impeller connected to the rotary blade connection portion of the drive shaft for rotation, a pump cover including a lower intake opening and a peripheral discharge positionable to discharge water out through the side of the housing of the lawn mower.

4 Claims, 3 Drawing Figures

LAWN MOWER PUMP

BACKGROUND OF THE INVENTION

This is a new and improved rotary lawn mower pump for use in removing large quantities of water of shallow depth.

In the past regular stationary pumps would remove water quickly from a portion of a large shallow water area. Water from outlying shallow areas takes time to fill the void created by a pump in one area of a large area of shallow water. This old procedure made the removal of large quantities of shallow water very time consuming. The present invention provides a pump that can easily be moved back and forth as one would do when mowing a lawn. the use of a lawn mower housing, wheels, motor and motor shaft provides a new and improved lawn mower pump with the flexibility to quickly and efficiently remove water of shallow depth from a large area such as a parking lot or flooded building floors.

It is an object of this invention to provide an inexpensive portable pump for removing shallow water from a large area.

It is another object of this invention to provide a pump beneath a lawn mower housing to utilize the portable housing and motor drive of a lawn mower.

It is a further object of this invention to provide a practical pump means that can easily be connected and disconnected to a conventional rotary lawn mower.

SUMMARY OF THE INVENTION

A new and improved pump connected under a lawn mower housing having wheels connected to the sides of the housing and a motor positioned on the top of the housing with a drive shaft through the housing to drive the pump positioned beneath the housing. A user may move the rotary lawn mower pump back and forth over a large area having water of shallow depth to quickly remove the water. The rotary lawn mower pump includes a rotary lawn mower and a pump positioned under the rotary lawn mower with an intake close to the ground. The lawn mower pump includes a housing, a push-pull handle connected to the housing and wheels connected to the sides of the housing to provide a mobile pump. The lawn mower motor is mounted on top of the housing. The motor may be an internal combustion engine or an electric motor. The motor shaft extends down through the housing to a position below the housing. The lower end of the shaft, the blade connection portion, is used to drive the pump.

The pump may be an impeller pump. The pump includes a cover and an impeller for rotation in the pump cover. The cover includes a lower intake and a peripheral or side discharge. A pump support is connected to the top of the pump cover and the underside of the lawn mower housing. The lower end of the shaft of the motor is connected to the impeller of the pump to rotate the impeller. The water enters the pump from the lower central inlet and exits the pump out of the peripheral exit. A hose may be connected to the exit of the pump and passed out through a side opening in the lawn mower housing.

The cover of the pump is adjustable by means of adjustable connectors between the pump support and the underside of the lawn mower housing. This adjustment also provides proper clearance between the impeller and the side of the pump cover.

In accordance with these and other objects which will be apparent hereinafter, the instant invention will now be described with particular reference to the accompanying drawings.

DESCRIPTION OF THE PREFERRED EMBODIMENT

Figure 1:
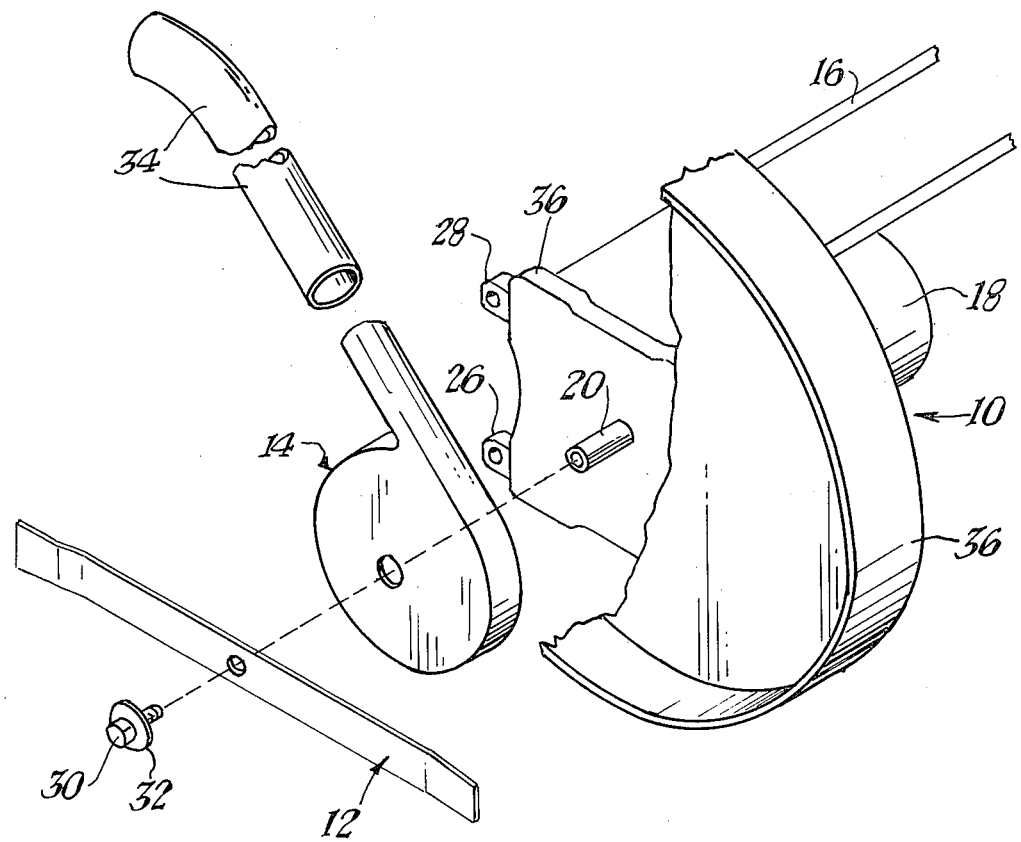
FIG. 1 is an illustration of a portion of a rotary lawn mower showing the pump in an expanded unattached position and showing a rotary lawn mower blade in an expanded unattached position along the drive shaft center line.
Figure 3:
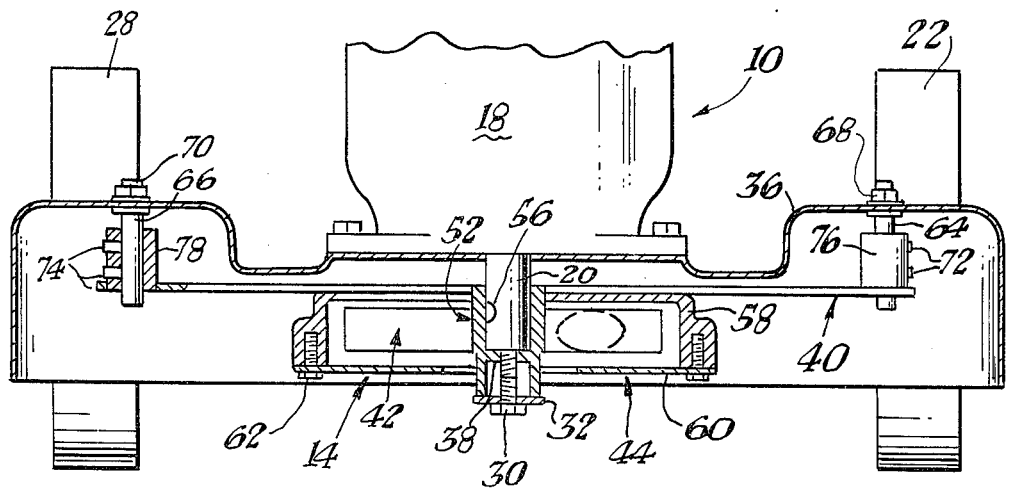
FIG. 3 is a front view of the rotary lawn mower pump partially broken away in cross section.
Figure 2:
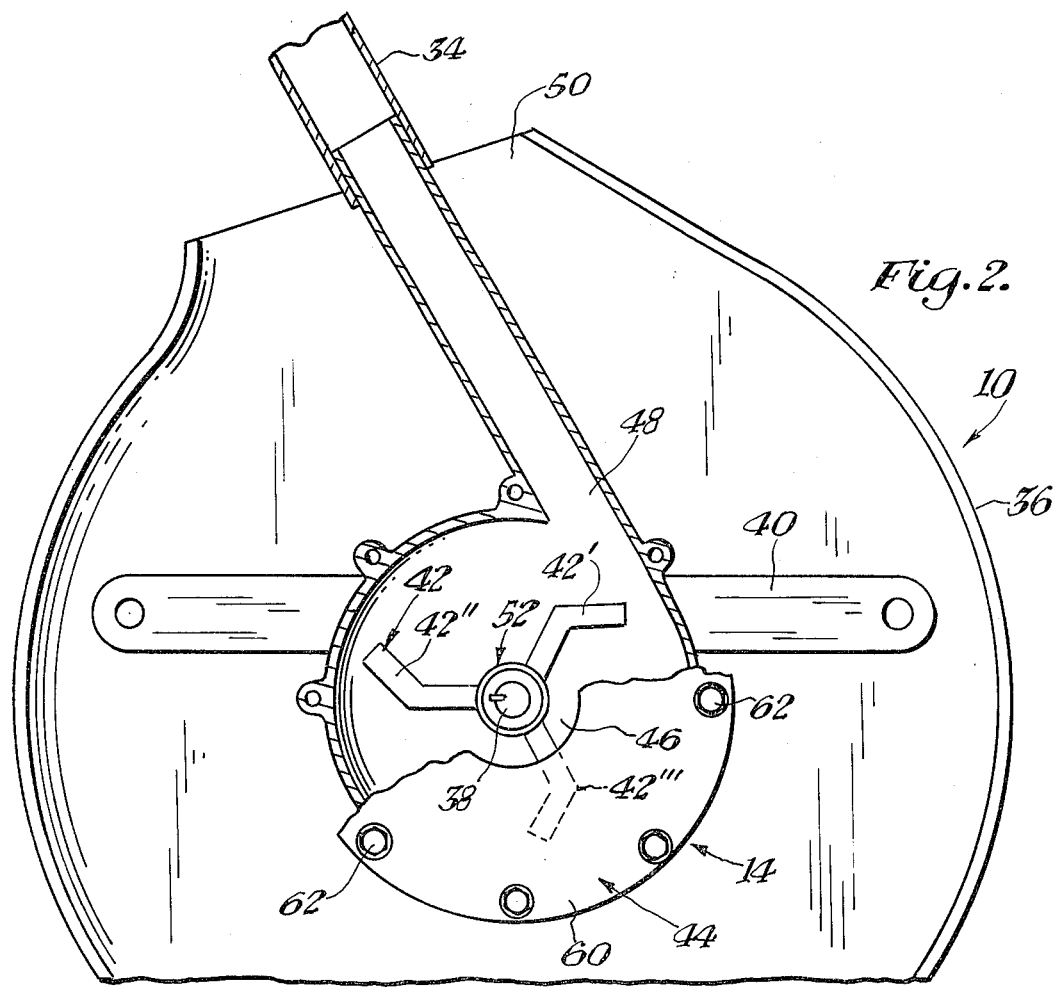
FIG. 2 is a bottom view partially broken away of the rotary lawn mower pump.

Referring now to the drawing, FIGS. 1, 2 and 3 illustrates a rotary lawn mower 10 with handle 16, wheels 22, and 28, motor 18, mower housing 36 that normally has a rotary blade 12 attached to drive shaft 20. The rotary blade 12 is easily replaced by the pump 14. The rotary lawn mower has a handle 16, motor 18 with drive shaft 20, connected to housing 36 by extensions 26 and 28' and rotating wheels 22, and 28 on axles connected to the mower housing 36. The bolt 30 and washer 32 may be used to connect and unconnect the pump 14 and blade 12 from engagement with the drive shaft 20. The present invention, a rotary lawn mower pump, replaces blade 12 with pump 14. The rotary lawn mower pump can be easily utilized by moving the lawn mower pump back and forth over a shallow flooded area to quickly and efficiently remove water. A discharge pipe 34 may be connected to the pump 14 to discharge water to a particular discharge area. The powerful lawn mower motor 18 drives the pump to force the exiting water through various length pipes 34 to an appropriate discharge area.

The rotary lawn mower pump including a rotary blade lawn mower 10 including an upper housing 36 and an above housing motor 18 with a motor driven drive shaft 20. The drive shaft 20 extends through the housing 36 with rotary blade connection portion 38 at its distal end. The impeller pump 14 having a pump support 40 is removably connected to the upper housing 36. The impeller pump 14 includes a rotatable impeller 42 having blades 42', 42" and 42'" connected to the hub 52. The hub is connected to the rotary blade connection portion 38 of the drive shaft 20. The impeller pump has a pump cover 44 including a lower intake entrance or opening 46 and a peripheral discharge 48 positioned to discharge water out through the upper housing at the lawn mower grass exit 50.

This new and improved rotary lawn mower pump removes large quantities of water at shallow depths by lifting water through entrance or opening 46 on the bottom of the pump. The present pump can easily be moved back and forth in lawn mower motion to quickly and efficiently remove shallow water at a depth of two to four inches from a large area such as a parking lot.

Referring now to FIGS. 2 and 3, the motor 18 on the top of the housing or casing 36. The motor 18 is connected to the top of the housing. The pump 14 is shown connected to the mower housing 36 through pump support 40. The distal end 38 of the motor drive shaft is connected to the impeller 42 by bolt 30 and washer 32. The impeller hub 52 includes drive shaft engaging portion and key way 56. The pump cover 44 includes a base 58 and a removable lid 60. The base 58 and lid 60 are interconnected by bolts 62. The base 58 of the pump 14 is welded or otherwise connected to and positioned on top of the pump support 40. The pump support 40 is interconnected to the housing 36 by means of bolts 64 and 66 and nuts 68 and 70 respectively and lock screws 72 and 74 respectively. The lock screws allow adjustment of the position of the bolts 54 and 66 and the pump support 40. Sleeves 76 and 78 are connected to support 40. By adjustment of the position between sleeves 76 and 78 and bolts 64 and 66 respectively the support 40 and the pump cover 44 with base 58 is moved toward and away from the housing 36. This movement adjusts the distance between the base 58 and the top of blades 42. The position of the base 58 of the pump is adjusted after the impeller 42 is installed and its position is fixed to the drive shaft 38.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A rotary blade lawn mower pump movable on wheels from place to place comprising:

a rotary blade lawn mower including a mower housing with usable rotatable wheels connected to said housing;

a motor connected to said housing, said motor including a drive shaft means driven by and connected to said motor, said drive shaft means having a connecting portion, said drive shaft means extending outward to said connecting portion;

an impeller pump including a pump cover, an impeller freely rotatable in said pump cover, and a pump support, said pump support connected to said pump cover and removably connected to said mower housing, said impeller connected to said connecting portion of said drive shaft, said pump cover including an inlet opening and a discharge outlet, whereby said rotary blade lawn mower pump is easily movable from place to place on said usable rotatable wheels to pump out large areas of water of a relatively shallow depth.

2. A rotary blade lawn mower pump as set forth in claim 1, wherein:

said usable rotatable wheels supporting said rotary blade lawn mower above the ground;

said mower housing includes a top and bottom;

said motor is connected to said top;

said drive shaft extending through said motor housing;

said pump cover having a lower opening inlet;

said pump cover having a peripheral discharge outlet.

3. A rotary blade lawn mower pump as set forth in claim 2, wherein:

said impeller is directly connected to the end of said drive shaft;

said pump support adjustably connectable to said housing to provide impeller clearance above the ground.

4. A rotary blade lawn mower pump as set forth in claim 3, wherein:

said pump is removable to replace a rotatable grass cutting blade.

* * * * *